United States Patent
Lupsa et al.

(10) Patent No.: US 10,498,123 B2
(45) Date of Patent: Dec. 3, 2019

(54) SUPPORT BRACKET FOR MOUNTING OCTAGONAL BOXES ON FURRING CHANNELS

(71) Applicant: Thomas & Betts International LLC, Wilmington, DE (US)

(72) Inventors: Ioan-Liviu Lupsa, Dollard-des-Ormeaux (CA); Marc-Antoine Veillette, Ange-Gardien (CA)

(73) Assignee: Thomas & Betts International LLC, Wilmington, DE (US)

( * ) Notice: Subject to any disclaimer, the term of this patent is extended or adjusted under 35 U.S.C. 154(b) by 355 days.

(21) Appl. No.: 15/067,745

(22) Filed: Mar. 11, 2016

(65) Prior Publication Data
US 2016/0273706 A1   Sep. 22, 2016

Related U.S. Application Data

(60) Provisional application No. 62/135,414, filed on Mar. 19, 2015.

(51) Int. Cl.
*H02G 3/12* (2006.01)
*H01R 13/00* (2006.01)

(52) U.S. Cl.
CPC ............. *H02G 3/125* (2013.01); *H01R 13/00* (2013.01)

(58) Field of Classification Search
CPC ..... H02G 3/125; H16M 13/027; H01R 13/74; H01R 13/748
See application file for complete search history.

(56) References Cited

U.S. PATENT DOCUMENTS

| | | | |
|---|---|---|---|
| 2,448,109 A | 8/1948 | Michael | |
| 2,937,837 A | 5/1960 | Johnson | |
| 2,962,252 A * | 11/1960 | Frank | H02G 3/126 |
| | | | 174/63 |
| 4,757,967 A | 7/1988 | Delmore | |
| 4,967,990 A | 11/1990 | Rinderer | |

(Continued)

FOREIGN PATENT DOCUMENTS

CA   2 829 961 A1   4/2014

*Primary Examiner* — Rick K Chang
(74) *Attorney, Agent, or Firm* — Taft Stettinius & Hollister LLP

(57) ABSTRACT

A support bracket for an electrical connection box is used with metal furring channels in a ceiling. A central web has a first end hole, and a plurality of top holes arrayed longitudinally adjacent a second end for selective attachment to a second furring channel. A guide flange projects downward from the central web at the first end, and is placed directly against a first furring channel, to align the support bracket perpendicular to the channel. The guide flange is bent around the first furring channel. The guide flange receives a fastener through a guide hole, the first channel, and the first end hole. Right and left side mounting flanges project downward from the central web. The mounting flanges have a plurality of mounting holes arrayed longitudinally for attaching the electrical connection box. The mounting flanges are biased inwardly toward one another to receive the box for mounting between them and to support the box temporarily, for selective longitudinal and vertical placement of the electrical connection box during installation.

22 Claims, 9 Drawing Sheets

(56) References Cited

U.S. PATENT DOCUMENTS

| | | | | |
|---|---|---|---|---|
| 5,114,105 A * | 5/1992 | Young | ............. | H02G 3/126 |
| | | | | 248/27.1 |
| 5,114,365 A * | 5/1992 | Thompson | ............. | H01R 24/76 |
| | | | | 174/66 |
| 5,209,444 A | 5/1993 | Rinderer | | |
| 5,386,959 A | 2/1995 | Laughlin | | |
| 6,484,980 B2 | 11/2002 | Medlin | | |
| 7,053,300 B2 * | 5/2006 | Denier | ............. | H02G 3/18 |
| | | | | 174/50 |
| 7,312,396 B1 | 12/2007 | Gorman | | |
| 7,472,875 B2 | 1/2009 | Rinderer | | |
| 7,521,631 B2 * | 4/2009 | Dinh | ............. | H02G 3/125 |
| | | | | 174/480 |
| 8,740,158 B2 | 6/2014 | Silcox | | |
| 8,998,154 B2 * | 4/2015 | Lupsa | ............. | H02G 3/12 |
| | | | | 248/200.1 |
| 2009/0310371 A1 | 12/2009 | Goode | | |
| 2013/0180190 A1 | 7/2013 | Bovet | | |

\* cited by examiner

SUPPORT BRACKET FOR MOUNTING OCTAGONAL BOXES ON FURRING CHANNELS

CROSS REFERENCE TO RELATED APPLICATIONS

This application claims priority to U.S. Provisional Patent Application No. 62/135,414 filed on Mar. 19, 2015, the contents of which is incorporated herein by reference in its entirety.

FIELD OF THE INVENTION

The presently disclosed technologies are directed to the field of electrical boxes, and more specifically, to an apparatus and method for mounting an octagonal electrical connection box on metal support channels in a ceiling construction.

BACKGROUND OF THE INVENTION

Ceilings suspended on furring support channels are used in concrete condo buildings and in industrial buildings. Octagonal boxes are installed between the furring channels. The boxes are used for wiring connections for lighting fixtures. In many cases, prior to the electrical box installation, the electrician will mark on the floor the planned position of the ceiling box. The electrician is compelled to make and install artisanal (handmade) supports on the construction site, as shown in FIGS. 1-4. The electrician will first measure the distance between the furring channels, then cut the artisanal supports to this distance. The box is aligned with the marking already done on the floor. The electrician will drill holes where needed, and then screw everything in place on the furring channels. The octagonal box is then mounted on the makeshift artisanal support. More than two hands or vise grip pliers can be required at some installation steps. There is no product on the market to support octagonal boxes on ceilings suspended on furring channels. The entire procedure is labor intensive and time-consuming. The electrical connection box can be of any shape, as well as octagonal.

SUMMARY OF THE INVENTION

In one aspect, a support bracket for an electrical connection box is for use with metal furring channels in a ceiling. The electrical connection box has a predetermined width and depth. A central web extends between opposite first and second ends and between opposite right and left sides, and has a first end hole therethrough adjacent the first end for attachment to a first channel of the furring channels. The central web has at least one top hole therethrough adjacent the second end for attachment to a second channel of the furring channels.

A right side mounting flange projects downward from the central web right side, and has at least one mounting hole therethrough for attaching the electrical connection box. A left side mounting flange projects downward from the central web left side, and has at least one mounting hole therethrough for attaching the electrical connection box. The right and left side mounting flanges are spaced apart from one another and adapted to receive the electrical connection box for mounting therebetween.

A guide flange projects downward from the central web at the first end, and has at least one guide hole therethrough for attachment to the first channel.

In another aspect, a support bracket for an electrical connection box is for use with metal furring channels in a ceiling. The electrical connection box has a predetermined width and depth. A central web extends between opposite first and second ends and between opposite right and left sides, and has an opening therethrough. The central web has at least one first end hole therethrough adjacent the first end for attachment to a first channel of the furring channels. The central web has a plurality of top holes therethrough arrayed longitudinally for selective attachment of the support bracket to a second channel of the furring channels.

A right side mounting flange projects downward from the central web right side, and extends longitudinally from adjacent the first end toward the second end. The right side mounting flange has a plurality of mounting holes therethrough arrayed longitudinally for attaching the electrical connection box. A left side mounting flange projects downward from the central web left side, and extends longitudinally from adjacent the first end toward the second end. The left side mounting flange has a plurality of mounting holes therethrough arrayed longitudinally for attaching the electrical connection box. The right and left side mounting flanges are spaced apart from one another on either side of the opening, and are adapted to receive the electrical connection box for mounting therebetween. The right and left side mounting flanges are biased inwardly toward one another for supporting the electrical connection box temporarily during installation, thereby allowing selective longitudinal and vertical placement of the electrical connection box.

A guide flange is attached to the central web at the first end and is disposed below the central web. The guide flange extends transversely between the central web right and left sides, and has at least one guide hole therethrough adjacent the first end hole. The guide flange is adapted for placement directly against the first channel so as to align the first end with the first channel, and to align the support bracket generally perpendicular to the first channel. The guide flange is adapted for bending around the first channel, so as to sandwich the first channel between the guide flange and the central web with the guide hole generally aligned with the first end hole. The guide flange is adapted to receive a fastener through the guide hole, and guide the fastener through the first channel and through the first end hole, so as to clamp the first channel between the guide flange and the central web.

The support bracket is unitary, thereby allowing one-handed installation. The support bracket is adapted for installation on top of the metal furring channels so as to allow temporary support for the support bracket during installation. This allows the support bracket to slide along the furring channels thereby allowing selective positioning.

In yet another aspect, a method is disclosed for supporting an electrical connection box, and is for use with metal furring channels in a ceiling. The electrical connection box has a predetermined width and depth. The method comprises providing a unitary support bracket with a central web. The central web has a right side mounting flange projecting away from adjacent a central web right side. The central web has a left side mounting flange projecting away from adjacent a central web left side. The support bracket extends longitudinally between opposite first and second ends.

The support bracket is juxtaposed between the furring channels. The support bracket is installed on top of the metal furring channels, thereby supporting the support bracket temporarily during installation. The first end is attached to a first channel of the furring channels. The second end is attached to a second channel of the furring channels. The electrical connection box is received between the right and left side mounting flanges. The electrical connection box is attached to the flanges.

These and other aspects, objectives, features, and advantages of the disclosed technologies will become apparent from the following detailed description of illustrative embodiments thereof, which is to be read in connection with the accompanying drawings.

Figure 1:
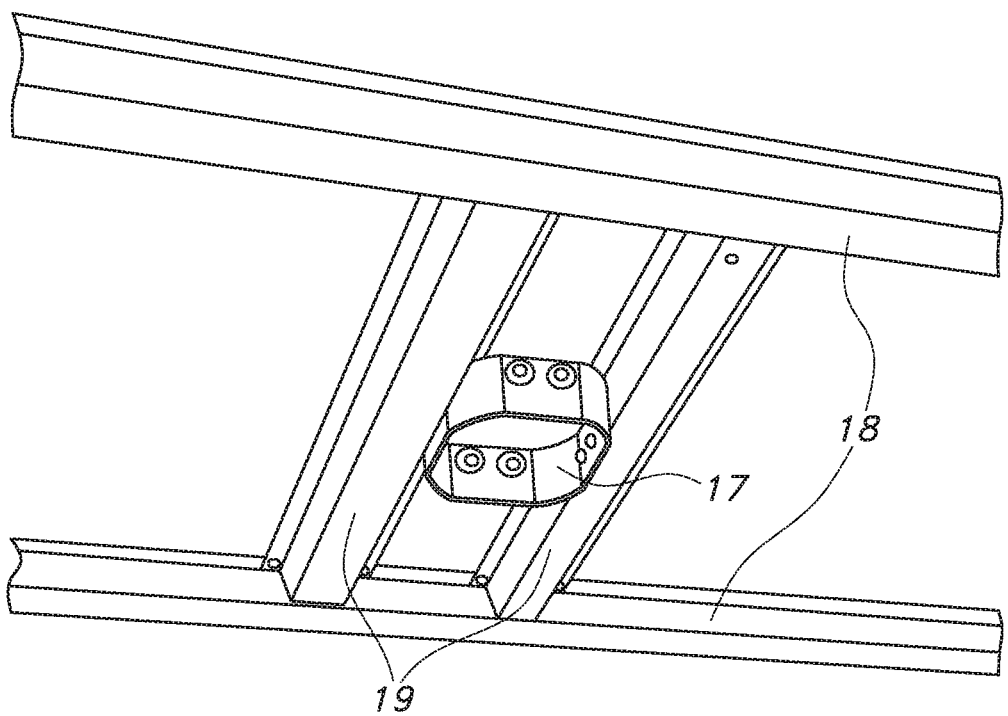
FIG. 1 is a bottom perspective view of a prior art support bracket for an octagonal electrical connection box.
Figure 2:
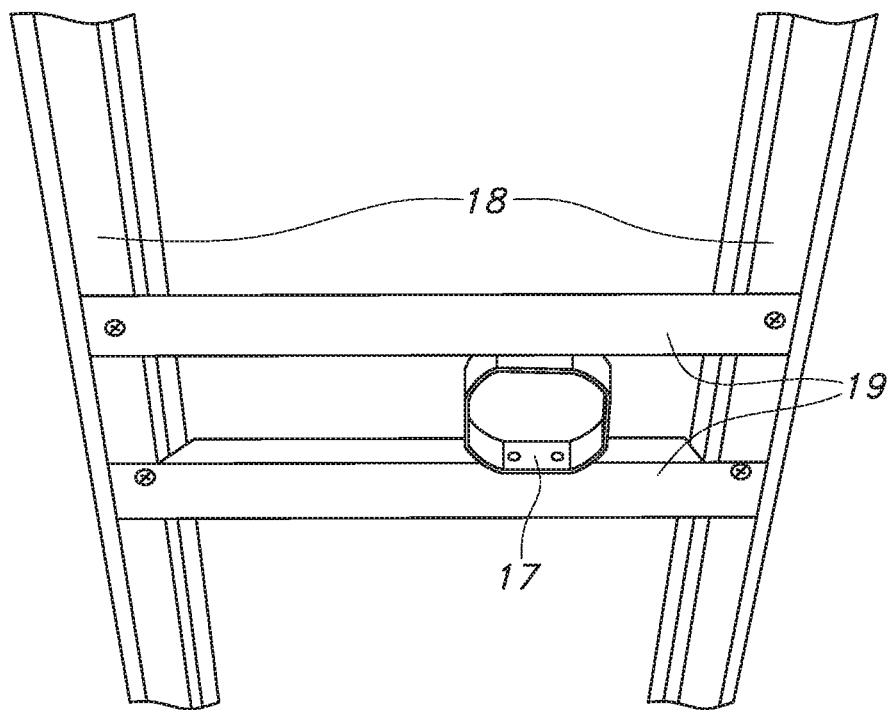
FIG. 2 is a bottom perspective view of another prior art support bracket for an octagonal electrical connection box.
Figure 3:
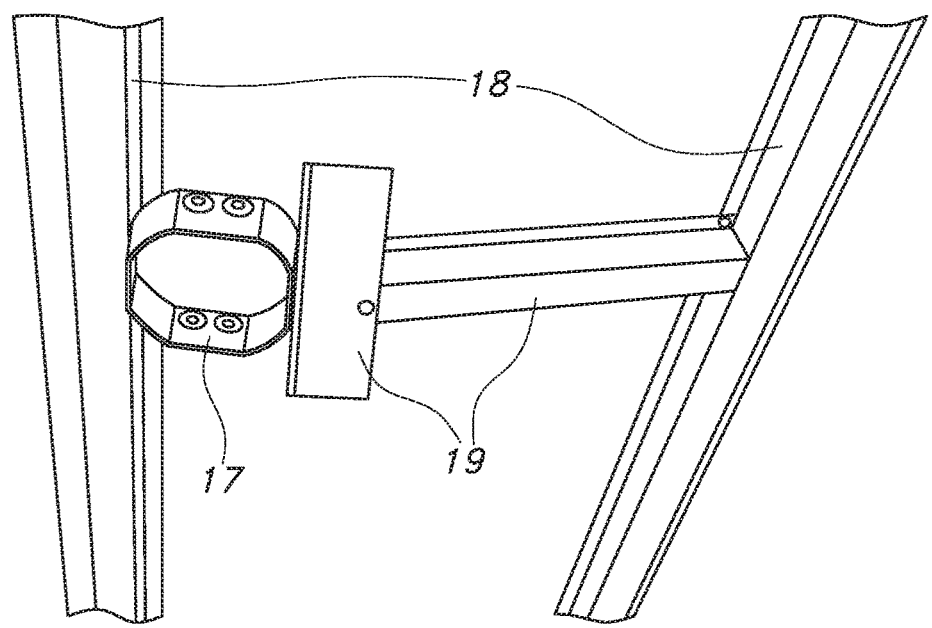
FIG. 3 is a bottom perspective view of yet another prior art support bracket for an octagonal electrical connection box.
Figure 4:
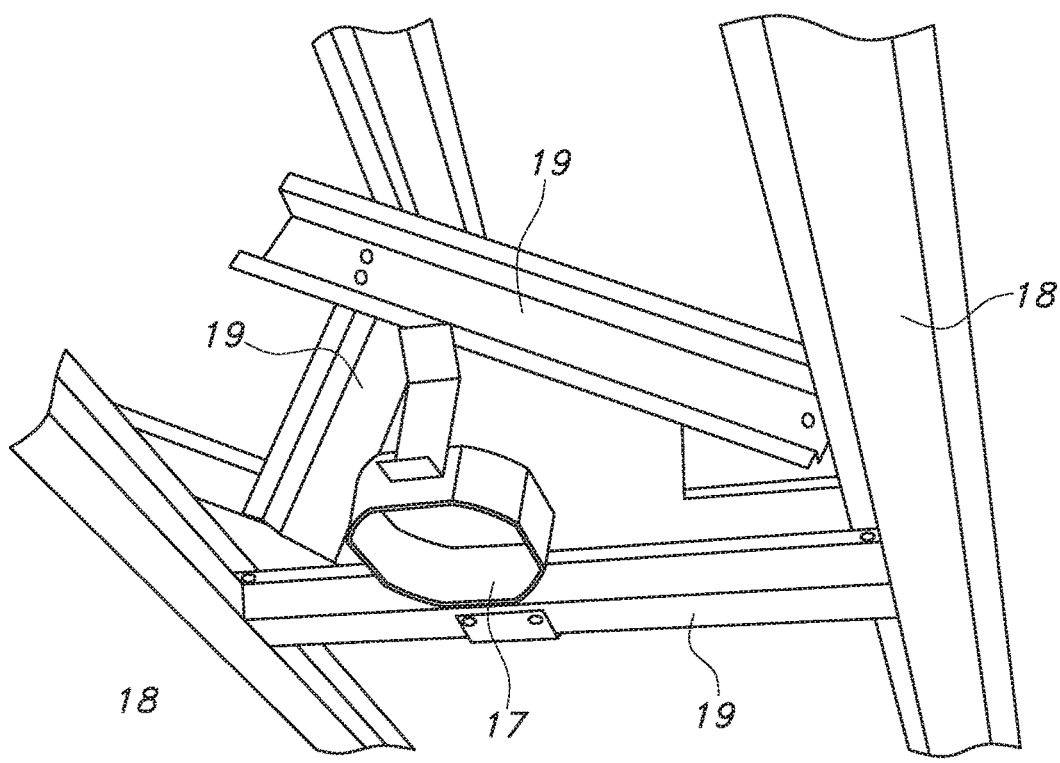
FIG. 4 is a bottom perspective view of still another prior art support bracket for an octagonal electrical connection box.
Figure 5:
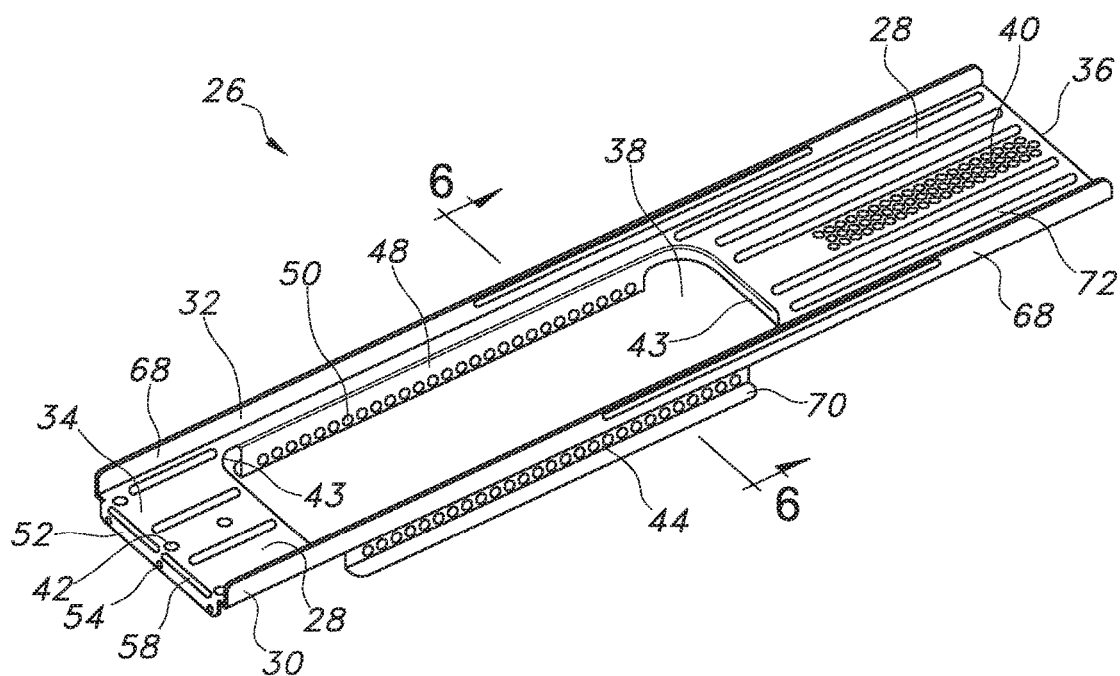
FIG. 5 is a top perspective view of an exemplary support bracket for an octagonal electrical connection box constructed in accordance with the invention.
Figure 6:
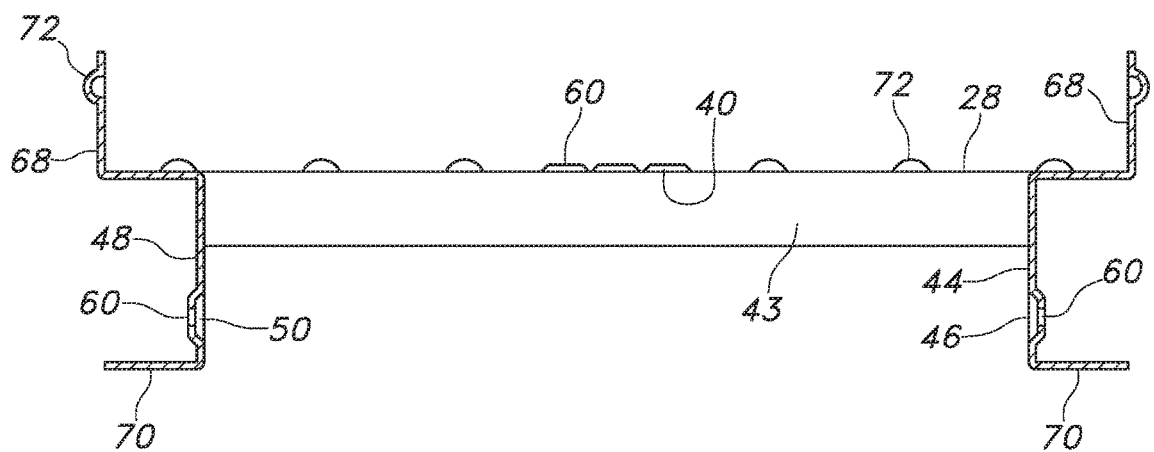
FIG. 6 is a side elevational, sectional view of the support bracket for an octagonal electrical connection box of FIG. 5, taken along lines 6-6 of FIG. 5.

It should be noted that the drawings herein are not to scale.

DETAILED DESCRIPTION OF THE PREFERRED EMBODIMENT

Describing now in further detail these exemplary embodiments with reference to the FIGS. 1-8 as described above, a support bracket 26 for an electrical connection box 20 is for use in connection with metal furring channels 22, 24 in a ceiling. The electrical connection box 20 has a predetermined width and depth. The support bracket 26 extends longitudinally between opposite first 34 and second 36 ends. The support bracket 26 comprises a central web 28 having opposite right 30 and left 32 sides, and extending longitudinally between the first 34 and second 36 ends. The central web 28 has an opening 38 therethrough extending transversely from adjacent the central web right side 30 to adjacent the central web left side 32. The opening 38 extends longitudinally from adjacent the first end 34 toward the second end 36. The opening 38 includes reinforcing flanges 43 extending around the opening 38 and abutting the right 44 and left 48 side mounting flanges.

The central web 28 has at least one top hole, and typically a plurality of top holes 40 therethrough adjacent the second end 36. The top holes 40 are arrayed longitudinally for selective attachment to a second channel 24 of the furring channels. The central web 28 has at least one first end hole 42 therethrough adjacent the first end 34 for attachment to a first channel 22 of the furring channels. The central web 28 can have more than one first end hole 42 therethrough. As shown in the Figures, the central web 28 has three first end holes 42.

A right side mounting flange 44 projects away from adjacent the central web right side 30. Typically, the right side mounting flange 44 projects downward from the opening at approximately a right angle to the central web 28. The right side mounting flange 44 extends longitudinally from adjacent the first end 34 partway toward the second end 36. The right side mounting flange 44 has a plurality of right side mounting holes 46 therethrough arrayed longitudinally, for attaching the electrical connection box 20.

A left side mounting flange 48 projects away from adjacent the central web left side 32. Typically, the left side mounting flange 48 projects downward from the opening 38 at approximately a right angle to the central web 28. The left side mounting flange 48 extends longitudinally from adjacent the first end 34 partway toward the second end 36. The left side mounting flange 48 has a plurality of mounting holes 50 therethrough arrayed longitudinally, for attaching the electrical connection box 20.

The right 44 and left 48 side mounting flanges are adapted to receive the electrical connection box 20 therebetween. The right and left side mounting flanges are resiliently biased inwardly toward one another when the electrical connection box 20 is placed between them. The bias provides a gentle but sufficiently firm squeeze for supporting the electrical connection box 20 temporarily during installation. The squeeze bias allows sliding the electrical connection box 20 by hand into the desired position. The novel biased structure thereby allows selective longitudinal and vertical placement of the electrical connection box 20.

The arrays of mounting holes 46 and 50 allow selective attachment of the electrical connection box 20 to the right 44 and left 48 side mounting flanges by threaded fasteners 56, two on each side. Arrow 62 shows the adjustable positioning of the electrical connection box 20 between the side mounting flanges 44, 48. The present invention utilizes four fasteners in shear to attach the box to the support bracket 26.

A guide flange 52 is attached to the central web 28 at the first end 34 and disposed below the central web 28. The guide flange 52 extends transversely between the central web right 30 and left 32 sides. Typically, the guide flange 52 projects downward from the central web 28 at approximately a right angle. The guide flange 52 is adapted for placement directly against the first channel 22 so as to align the central web first end 34 with the first channel 22. The electrician in the field will push the guide flange 52 against the first channel 22 to ensure alignment. The guide flange 52 will also thereby align the support bracket 26 generally perpendicular to the first channel 22. The novel structure allows rapid and selective positioning along the furring channels 22, 24, as shown by arrow 64. The guide flange 52 has at least one guide hole 54 therethrough adjacent the first end hole 42. The guide flange 52 can have more than one guide hole 54 therethrough. As shown in the Figures, the guide flange 52 has three guide holes 54.

The top holes 40, the right side mounting holes 46, the left side mounting holes 50, the first end hole 42, and the guide hole 54 each have an annular recess 60 around the hole. The recess 60 resembles a countersink, and is adapted for guiding the threaded fastener 56 into the hole. This structure allows faster installation by the electrician in the field.

The guide flange 52 is adapted for bending around the first channel 22. This will sandwich the first channel 22 between the guide flange 52 and the central web 28 with the guide hole 54 generally aligned with the first end hole 42. The guide flange 52 is adapted to receive a fastener 56 through the guide hole 54, through the first channel 22, and through the first end hole 42. In this manner, the first channel 22 is clamped between the guide flange 52 and the central web 28. The electrician in the field will tighten the fastener 56 to ensure that the parts are clamped together. The novel clamping structure will ensure that the support bracket 26 will be tightly secured to the first channel 22, and that the support bracket 26 will not loosen or vibrate.

The guide flange 52 has a region of weakness 58 where the guide flange 52 is attached to the central web 28. The region of weakness 58 extends transversely between the central web right 30 and left 32 sides, so as to facilitate the bending of the guide flange 52 around the first channel 22. The region of weakness 58 can comprise a slot or an array of holes formed through the guide flange 52. The region of weakness 58 can comprise a stamped portion where the metal is thinner than the surrounding material. The region of weakness 58 can thus be any structure that will focus bending stresses along a line where the bending is required. The region of weakness 58 will allow the electrician to easily bend the guide flange 52 with pliers or fingers on the jobsite.

Figure 7:
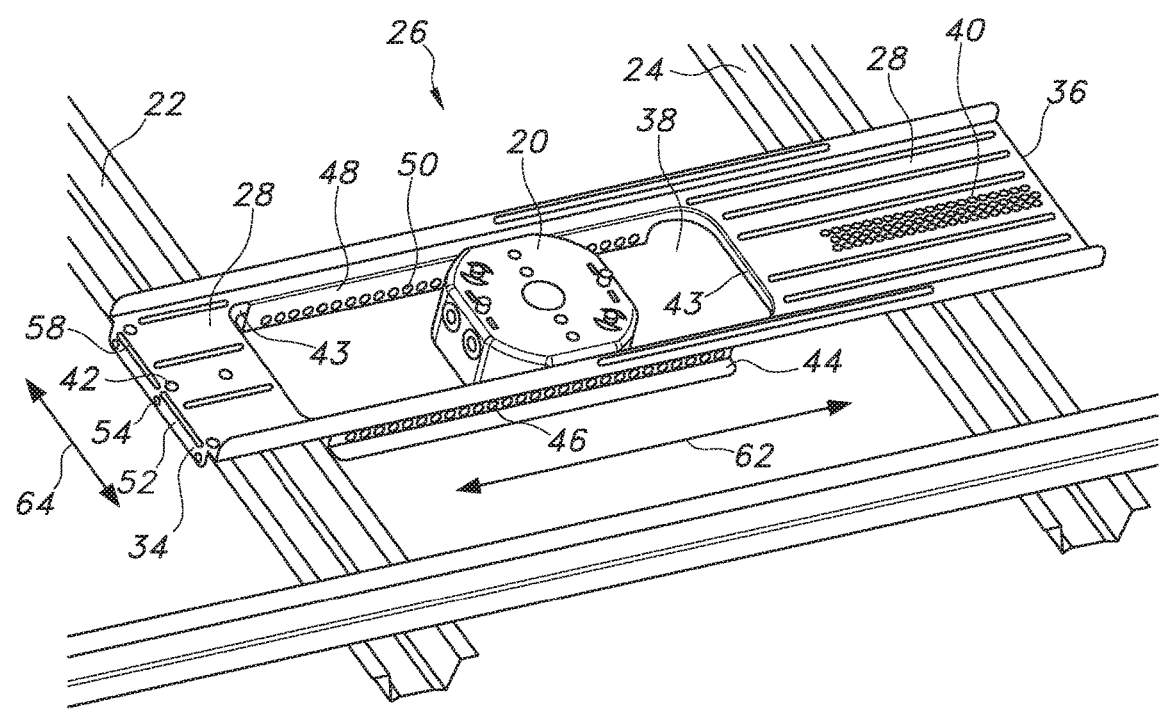
FIG. 7 is a top perspective view of the support bracket for an octagonal electrical connection box of FIG. 5, showing the support placed into position.
Figure 8:
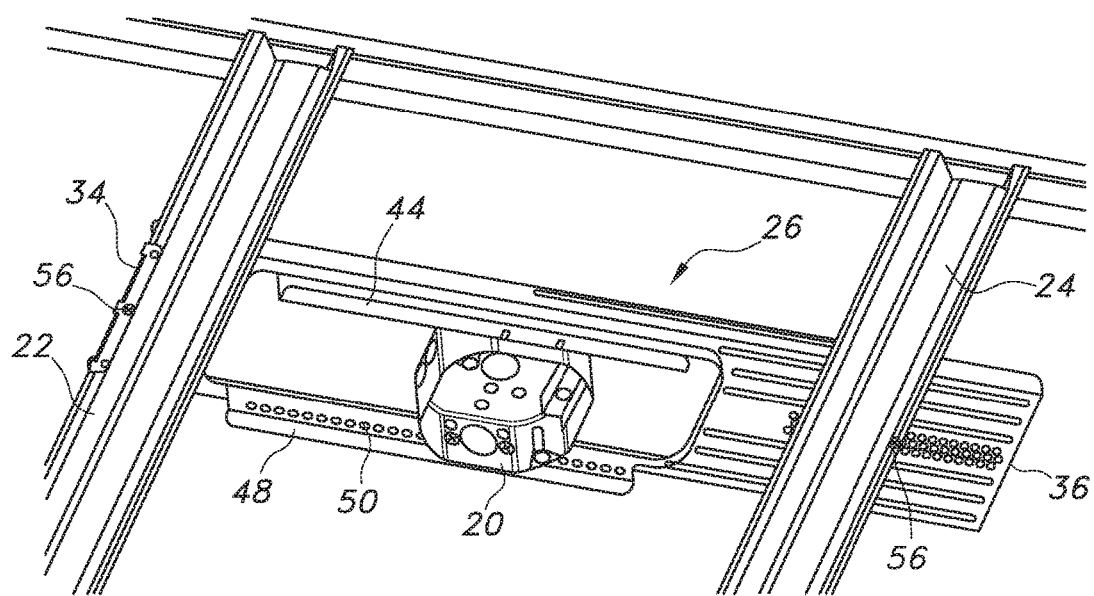
FIG. 8 is a bottom perspective view of the support bracket for an octagonal electrical connection box of FIG. 5, showing the support fastened in place.
Figure 9:
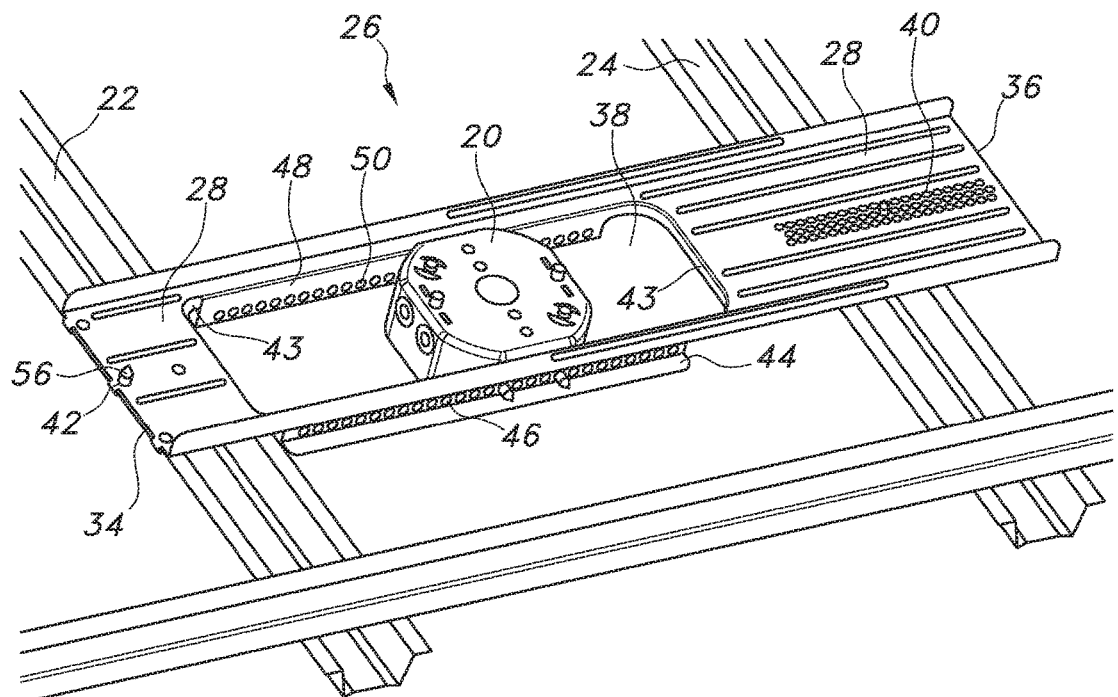
FIG. 9 is a top perspective view of the support bracket for an octagonal electrical connection box of FIG. 5, showing the support fastened in place.

The support bracket 26 is a unitary structure, providing a simple, one-piece construction for ease of installation. The support bracket 26 is adapted for installation on top of the metal furring channels 22, 24. This allows temporary support for the support bracket 26 during installation, while the electrician measures and positions the support bracket. The structure also allows the electrician to hold the support bracket 26 with one hand while wielding tools with the other hand. The support bracket 26 will suspend the electrical connection box 20 at the proper elevation to align with the outer surface of one or two layers of drywall 66, as shown in FIGS. 7 and 8.

Only two fasteners are required in the present invention to attach the support bracket 26 to the furring channels 22 and 24. This is in contrast to a larger number of fasteners used in the prior art to attach the artisanal supports to the furring channels. For example, 8 fasteners are used in prior art FIG. 1 and four screws in prior art FIG. 2. This fastener number reduction is due to the installation of the present invention support bracket 26 on the top of the furring channels 22 and 24. As a result, the vertical loading is supported by the channels and by the drywall and not by the screws.

Figure 10:
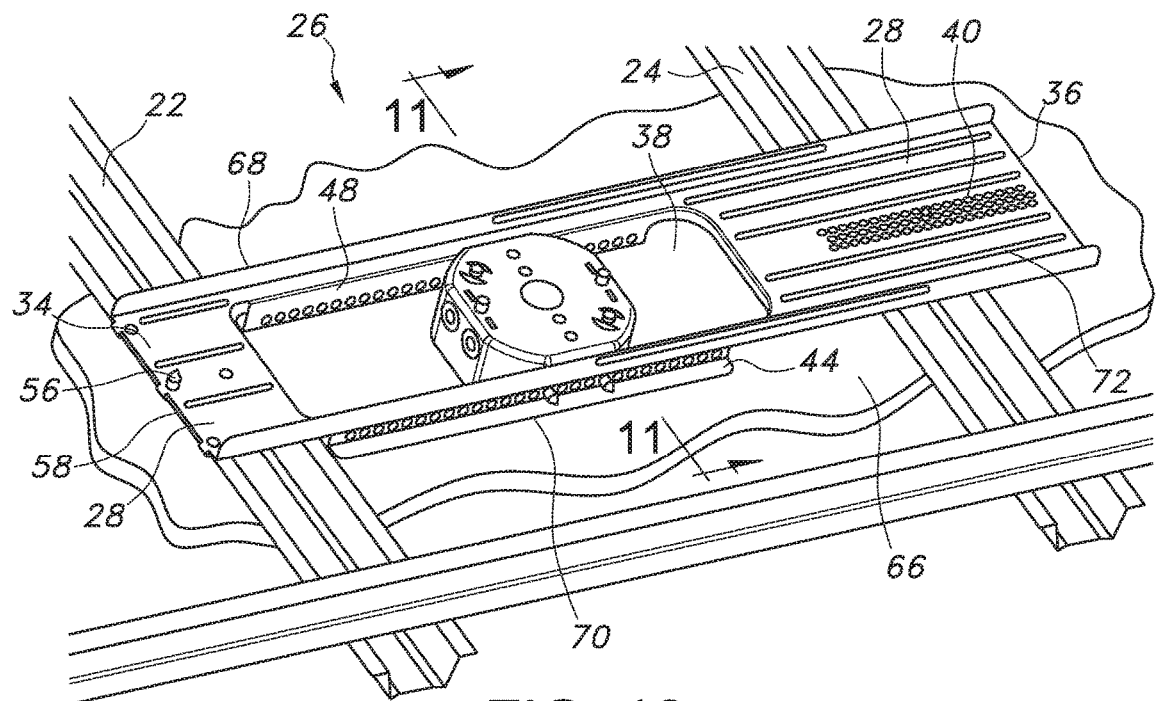
FIG. 10 is a top perspective view of the support bracket for an octagonal electrical connection box of FIG. 5, showing the support with drywall.
Figure 11:
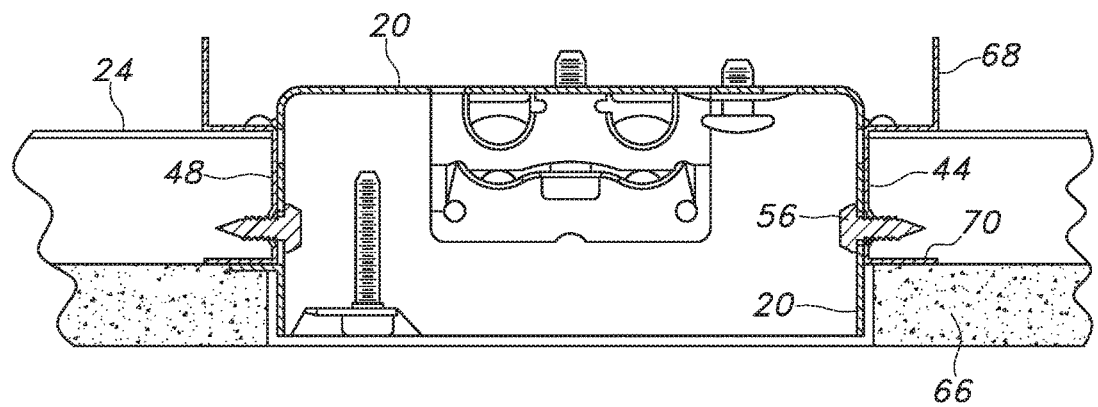
FIG. 11 is a side elevational, sectional view of the support bracket for an octagonal electrical connection box of FIG. 5, taken along lines 11-11 of FIG. 10, and showing the connection box and one layer of drywall.
Figure 12:
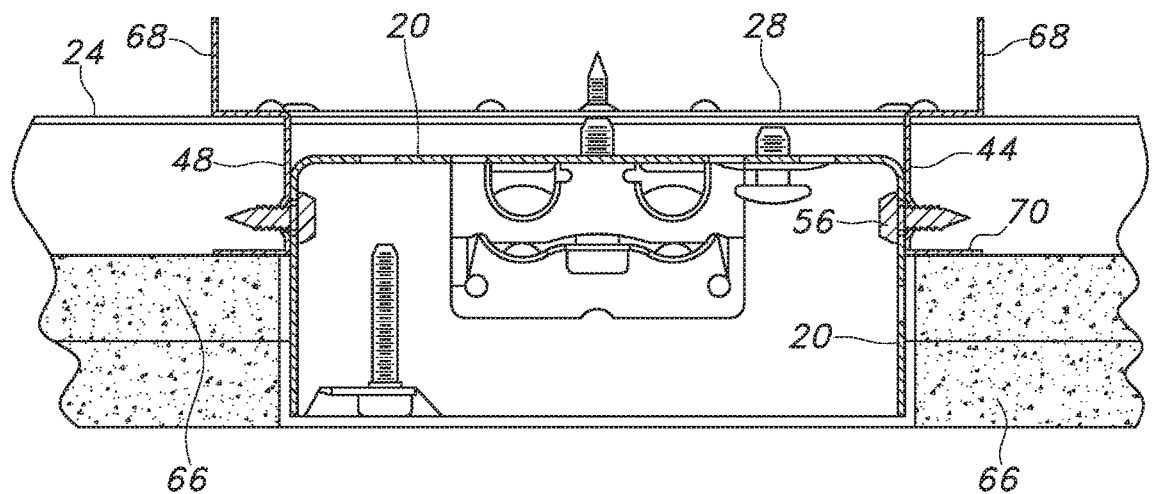
FIG. 12 is a side elevational, sectional view of the support bracket for an octagonal electrical connection box of FIG. 5, taken along lines 11-11 of FIG. 10, and showing the connection box and two layers of drywall.

Typically, the support bracket 26 will include a reinforcing flange 68 extending longitudinally along either side of the central web 28. The support bracket 26 will also include a bottom flange 70 along each of the right 44 and left 48 side mounting flanges for strengthening the side mounting flanges. The bottom flange 70 will also increase the system's rigidity by bearing on the drywall, as shown in FIG. 10. Also included are optional ribs 72 to stiffen the central web 28, as deemed necessary by those skilled in the art.

A method is disclosed for supporting an electrical connection box 20, and is for use in connection with metal furring channels in a ceiling. The electrical connection box 20 has a predetermined width and depth. The method comprises providing a unitary support bracket 26 with a central web 28. The central web 28 has a right side mounting flange 44 projecting away from adjacent a central web right side 30. The central web 28 has a left side mounting flange 48 projecting away from adjacent a central web left side 32. The support bracket 26 extends longitudinally between opposite first 34 and second ends 36.

The support bracket 26 is juxtaposed between the furring channels 22, 24. The support bracket 26 is installed on top of the metal furring channels, thereby supporting the support bracket 26 temporarily during installation. The first end 34 is attached to a first channel 22 of the furring channels. The second end 36 is attached to a second channel 24 of the furring channels. The electrical connection box 20 is received between the right 44 and left 48 side mounting flanges. The electrical connection box 20 is attached to the flanges 44, 48.

An opening 38 is formed through the central web 28. The opening 38 extends transversely from adjacent the central web right side 30 to adjacent the central web left side 32. The opening 38 extends longitudinally from adjacent the first end 34 toward the second end 36. The right side mounting flange 44 projects downward from the opening 38. The left side mounting flange 48 projects downward from the opening 38.

A plurality of top holes 40 is formed through the central web 28 adjacent the second end 36. The top holes 40 are arrayed longitudinally. The second end 36 is attached selectively to the second channel 24 through one of the top holes 40 with a threaded fastener 56. A first end hole 42 is formed through the central web 28 adjacent the first end 34. The first end 34 is attached to the first channel 22 through the first end hole 42 with a threaded fastener 56.

A plurality of mounting holes 46 is formed through the right side mounting flange 44. The mounting holes 46 are arrayed longitudinally for selectively positioning the electrical connection box 20. A plurality of mounting holes 50 is formed through the left side mounting flange 48. The mounting holes 50 are arrayed longitudinally for selectively positioning the electrical connection box 20.

The right 44 and left 48 side mounting flanges are biased inwardly toward one another for supporting the electrical connection box 20 temporarily during installation. This allows selective longitudinal and vertical placement of the electrical connection box 20. The electrical connection box 20 is attached to the mounting flanges 44, 48 with threaded fasteners 56.

A guide flange 52 is attached to the central web 28 at the first end 34. The guide flange 52 is disposed below the central web 28. The guide flange 52 extends transversely between the central web right 30 and left 32 sides. At least one guide hole 54 is formed through the guide flange 52 adjacent the first end hole 42. The guide flange 52 is placed directly against the first channel 22, thereby aligning the central web first end 34 with the first channel 22. The support bracket 26 is thereby aligned generally perpendicular to the first channel 22. A threaded fastener 56 is received through the guide hole 54, through the first channel 22, and through the first end hole 42. The guide flange 52 projects downward from the central web 28.

The guide flange 52 is bent around the first channel 22. The first channel 22 is sandwiched between the guide flange 52 and the central web 28 with the guide hole 54 generally aligned with the first end hole 42. The first channel 22 is clamped between the guide flange 52 and the central web 28 with the fastener 56. A region of weakness 58 is provided where the guide flange 52 is attached to the central web 28. The region of weakness 58 extends transversely between the central web right 30 and left 32 sides. The guide flange 52 is bent around the first channel 22 along the region of weakness 58.

An annular recess 60 is formed around each of the top holes 40, the right side mounting holes 46, the left side mounting holes 50, the first end hole 42, and the guide hole 54. Each threaded fastener 56 is guided into the respective hole with the annular recess 60.

Figure 13:
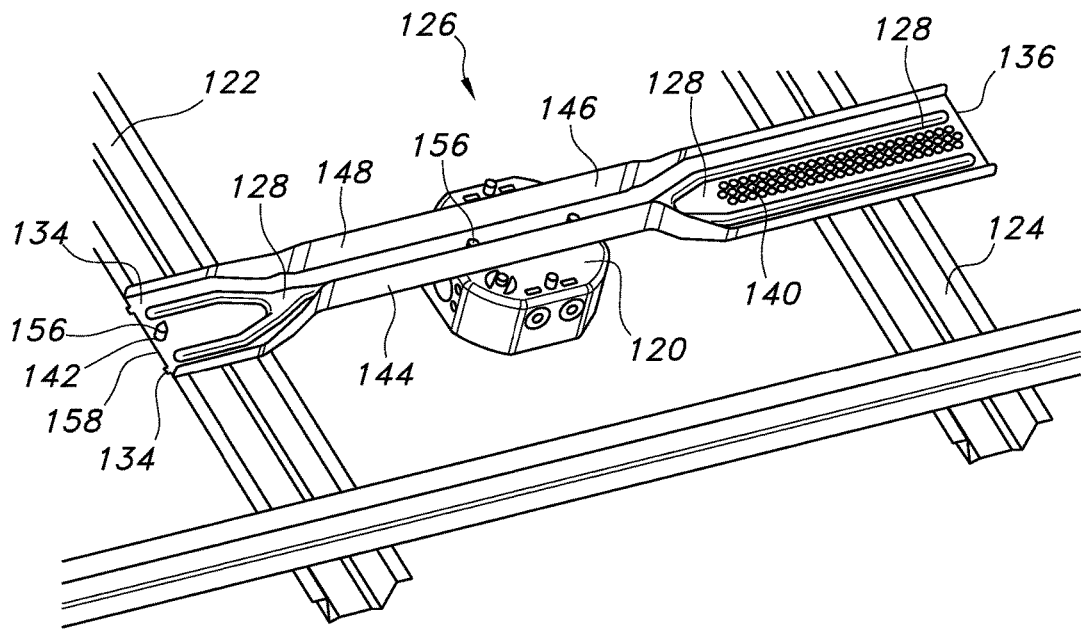
FIG. 13 is a top perspective view of another exemplary support bracket for an octagonal electrical connection box constructed in accordance with the invention, and showing the support fastened in place.
Figure 14:
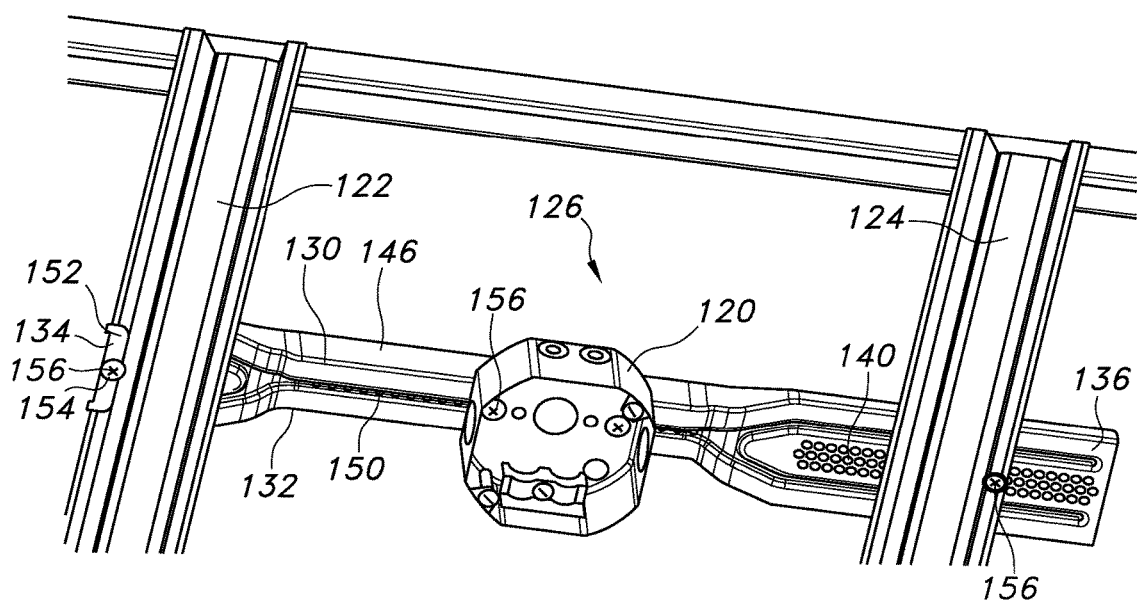
FIG. 14 is a bottom perspective view of the support bracket for an octagonal electrical connection box of FIG. 13, showing the support fastened in place.

Turning now to FIGS. 13-14, another support bracket 126 for an electrical connection box 120 is for use in connection with metal furring channels 122, 124 in a ceiling. The electrical connection box 120 has a predetermined width and depth. The support bracket 126 comprises a central web 128 having opposite right 130 and left 132 sides, and extending longitudinally between opposite first 134 and second 136 ends. The central web second end 136 is adapted for attachment to a second channel 124 of the furring channels. The central web 128 has at least one mounting hole 150 therethrough for mounting the electrical connection box 120 with a threaded fastener 156. A right side mounting flange 144 projects away from the central web right side 130. A left side mounting flange 148 projects away from the central web left side 132.

A first guide flange 152 is attached to the first end, and extends transversely between the central web right 130 and left 132 sides. The first guide flange 152 has at least one first guide hole 154 therethrough for attachment to a first channel 122 of the furring channels. The first guide flange 152 is attached to the central web 128 at the first end 134 and disposed below the central web 128. The first guide flange 152 is placed against the first channel 122 so as to align the central web first end 134 with the first channel 122. This also aligns the support bracket 126 generally perpendicular to the first channel 122. The first guide flange 152 projects downward from the central web 128.

The first guide flange 152 is bent around the first channel 122. This forms a sandwich structure with the first channel 122 between the first guide flange 152 and the central web 128. The central web 128 has at least one first end hole 142 therethrough adjacent the first end 134 and adjacent the guide hole 154 for attaching the first end 134 to the first channel 122. The first guide hole 154 is generally aligned with the first end hole 142, so that the fastener 156 will clamp the first channel 122 between the first guide flange 152 and the central web 128. The first guide flange 152 has a region of weakness 158 where the first guide flange 152 is attached to the central web 128. The region of weakness 158 extends transversely between the central web right 130 and left 132 sides, so as to facilitate the bending of the first guide flange 152 around the first channel 122.

The central web 128 has a plurality of top holes 140 therethrough arrayed longitudinally for selective attachment of the support bracket 126 to the second channel 124 with a threaded fastener 156.

Figure 15:
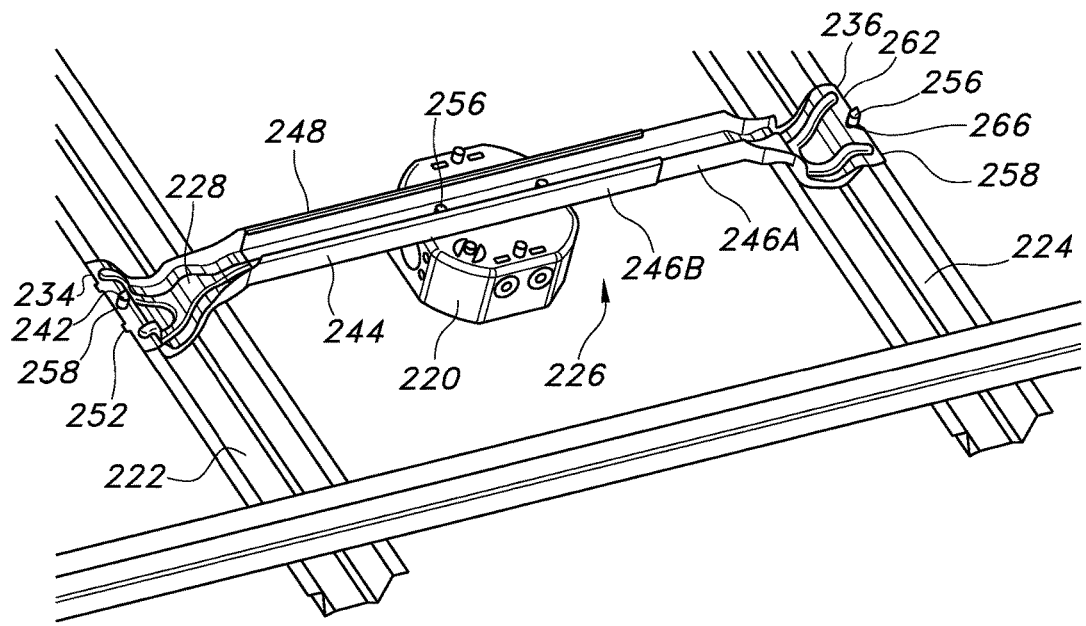
FIG. 15 is a top perspective view of yet another exemplary support bracket for an octagonal electrical connection box constructed in accordance with the invention, and showing the support fastened in place.
Figure 16:
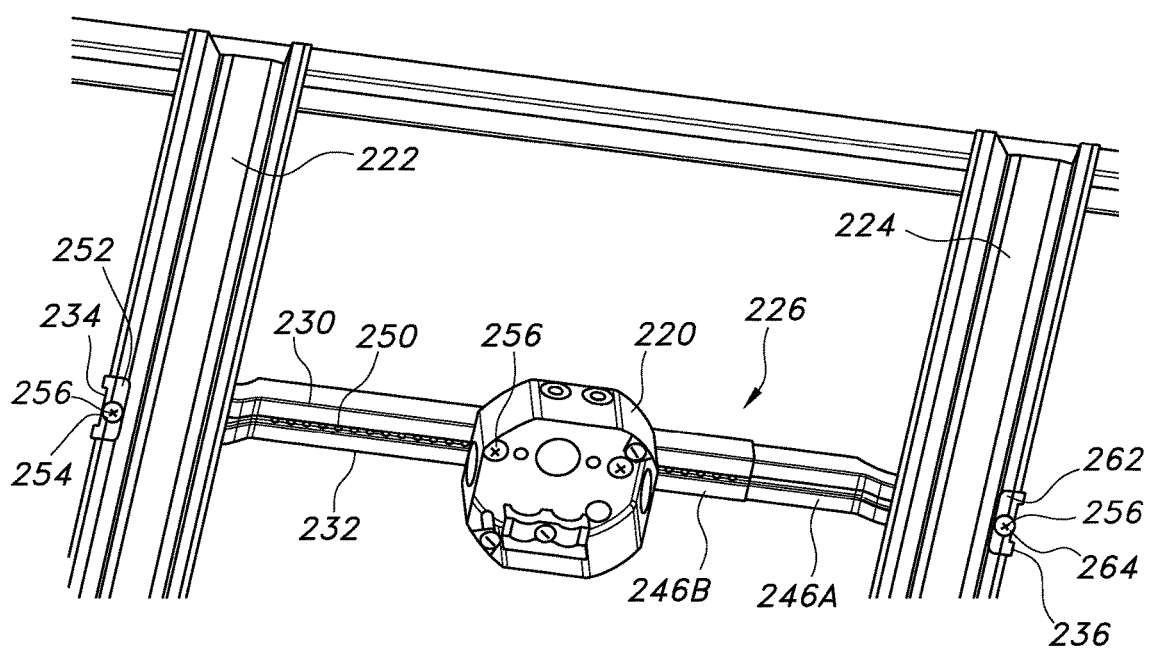
FIG. 16 is a bottom perspective view of the support bracket for an octagonal electrical connection box of FIG. 15, showing the support fastened in place.

Referring now to FIGS. 15-16, yet another support bracket 226 for an electrical connection box 220 is for use in connection with metal furring channels 222, 224 in a ceiling. The electrical connection box 220 has a predetermined width and depth. The support bracket 226 comprises a central web 228 having opposite right 230 and left 232 sides, and extending longitudinally between opposite first 234 and second 236 ends. The central web second end 236 is adapted for attachment to a second channel 224 of the furring channels. The central web 228 has at least one mounting hole 250 therethrough for mounting the electrical connection box 220 with a threaded fastener 256. A right side mounting flange 244 projects away from the central web right side 230. A left side mounting flange 248 projects away from the central web left side 232.

A first guide flange 252 is attached to the first end, and extends transversely between the central web right 230 and left 232 sides. The first guide flange 252 has at least one first guide hole 254 therethrough for attachment to a first channel 222 of the furring channels. The first guide flange 252 is attached to the central web 228 at the first end 234 and disposed below the central web 228. The first guide flange 252 is placed against the first channel 222 so as to align the central web first end 234 with the first channel 222. This also aligns the support bracket 226 generally perpendicular to the first channel 222. The first guide flange 252 projects downward from the central web 228.

The first guide flange 252 is bent around the first channel 222. This forms a sandwich structure with the first channel 222 between the first guide flange 252 and the central web 228. The central web 228 has at least one first end hole 242 therethrough adjacent the first end 234 and adjacent the guide hole 254 for attaching the first end 234 to the first channel 222. The first guide hole 254 is generally aligned with the first end hole 242, so that the fastener 256 will clamp the first channel 222 between the first guide flange 252 and the central web 228. The first guide flange 252 has a region of weakness 258 where the first guide flange 252 is attached to the central web 228. The region of weakness 258 extends transversely between the central web right 230 and left 232 sides, so as to facilitate the bending of the first guide flange 252 around the first channel 222.

A second guide flange 262 is attached to the second end 236. The second guide flange 262 extends transversely between the central web right 230 and left 232 sides. The second guide flange 262 has at least one second guide hole 264 therethrough for attachment to a second channel 224 of the furring channels. The second guide flange 262 projects downward from the central web 228. The second guide flange 262 is bent around the second channel 224.

The central web 228 has at least one first end hole 242 therethrough adjacent the first end 234 and adjacent the first guide hole 254 for attaching the first end 234 to the first channel 222. The central web 228 has at least one second end hole 266 therethrough adjacent the second end 236 and adjacent the second guide hole 264 for attaching the second end 236 to the second channel 224.

The first 252 and second 262 guide flanges each have a region of weakness 258 where each guide flange is attached to the central web 228. The region of weakness 258 extends transversely between the central web right 230 and left 232 sides, so as to facilitate the bending of each guide flange around the respective channel.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A support bracket for an electrical connection box for use with metal furring channels, the support bracket comprising:
   a central web extending between a first end and a second end, and between a right side and a left side, the central web having at least one first end hole therethrough adjacent the first end for selective receipt of a fastener for attachment to a first channel of the metal furring channels and at least one top hole therethrough adjacent the second end for selective receipt of another fastener for attachment to a second channel of the metal furring channels, the central web further including a lower reinforcing flange that extends downwardly through the central web and around an opening in the central web;
   a right side mounting flange adjacent to the right side of the central web, the right side mounting flange abutting the lower reinforcing flange and projecting downwardly from the central web in the same downward direction as the lower reinforcing flange, the right side mounting flange having at least one mounting hole therethrough positioned to align with at least one hole on a side of the electrical connection box;
   a left side mounting flange adjacent to the left side of the central web, the left side mounting flange abutting the lower reinforcing flange and projecting downwardly from the central web in the same downward direction as the lower reinforcing flange, the left side mounting flange having at least one mounting hole therethrough positioned to align with at least one hole on another side of the electrical connection box, the right and left side mounting flanges being spaced apart from one another and adapted to receive the electrical connection box for mounting therebetween;
   a first bottom flange positioned along the right side mounting flange, the first bottom flange being perpendicular to the right side mounting flange and extending from the right side mounting flange in an outwardly direction away from the left side mounting flange;
   a second bottom flange positioned along the left side mounting flange, the second bottom flange being perpendicular to the left side mounting flange and extending from the left side mounting flange in an outwardly direction away from the right side mounting flange;
   a guide flange projecting downward from the first end of the central web, the guide flange having at least one guide hole therethrough for attachment to the first channel; and
   a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

2. The support bracket of claim 1, wherein the at least one top hole that is adjacent to the second end comprises a plurality of top holes therethrough arrayed longitudinally, the plurality of top holes sized for selective receipt of a fastener for attachment of the support bracket to the second channel.

3. The support bracket of claim 2, wherein:
   the at least one mounting hole of the right side mounting flange comprises a plurality of mounting holes arrayed longitudinally;
   the at least one mounting hole of the left side mounting flange comprises a plurality of mounting; and
   the right and left side mounting flanges being biased inwardly toward one another for at least temporary supporting the electrical connection box.

4. The support bracket of claim 3, wherein the plurality of top holes, the plurality of mounting holes of the right and left side mounting flanges, and the at least one guide hole each further comprises an annular recess adapted for guiding the threaded fastener into the respective hole.

5. The support bracket of claim 1, wherein the support bracket is:
   unitary, thereby allowing one-handed installation; and
   adapted for installation on top of the metal furring channels so as to allow temporary support for the support bracket during installation, and to allow the support bracket to slide along the metal furring channels thereby allowing selective positioning.

6. A support bracket for an electrical connection box for use with metal furring channels in a ceiling, the support bracket comprising:
   a central web extending between a first end and a second end and between a right and a left side, the central web having at least one first end hole therethrough adjacent the first end for selective receipt of a fastener for attachment to a first channel of the metal furring channels, the central web having a plurality of top holes therethrough arrayed longitudinally adjacent the second end for selective receipt of another fastener for attachment of the support bracket to a second channel of the metal furring channels, the central web further including a lower reinforcing flange that extends downwardly through the central web and around an opening in the central web;
   a right side mounting flange adjacent to the right side of the central web, the right side mounting flange abutting the lower reinforcing flange and projecting downwardly from the central web in the same downward direction as the lower reinforcing flange, the right side mounting flange having at least one mounting hole therethrough positioned to align with at least one hole on another side of the electrical connection box;
   a left side mounting flange adjacent to the left side of the central web, the left side mounting flange abutting the lower reinforcing flange and projecting downwardly from the central web in the same downward direction as the lower reinforcing flange, the left side mounting flange having at least one mounting hole therethrough positioned to align with at least one hole on another side of the electrical connection box, the right and left side mounting flanges being spaced apart from one another and adapted to receive the electrical connection box for mounting therebetween;

a guide flange projecting downward from the central web, the guide flange extending transversely between the right side and the left side of the central web, the guide flange having at least one guide hole therethrough adjacent the at least one first end hole, the guide flange being adapted for placement directly against the first channel so as to align the first end with the first channel, and to align the support bracket generally perpendicular to the first channel, the guide flange being adapted to receive a threaded fastener that extends through each of the at least one guide hole, the first channel, and the at least one first end hole; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

7. The support bracket of claim 6, wherein the guide flange is adapted for bending around the first channel, so as to sandwich the first channel between the guide flange and the central web with the guide hole being generally aligned with the first end hole; and the guide flange being adapted to receive a fastener through the guide hole, and guide the fastener through the first channel and through the first end hole, so as to clamp the first channel between the guide flange and the central web.

8. The support bracket of claim 7, wherein the guide flange includes a region of weakness where the guide flange is attached to the central web, the region of weakness extending transversely between the right side and the left side of the central web so as to facilitate the bending of the guide flange around the first channel.

9. A support bracket for an electrical connection box, for use with metal furring channels in a ceiling, the electrical connection box having a predetermined width and depth, the support bracket comprising:

a central web extending between opposite first and second ends and between opposite right and left sides, the central web having an opening therethrough and a lower reinforcing flange that extends both about the opening and downwardly through the central web, the central web having at least one first end hole therethrough adjacent the first end for selective receipt of a fastener for attachment to a first channel of the metal furring channels, the central web having a plurality of top holes therethrough arrayed longitudinally adjacent the second end for selective receipt of a fastener for attachment of the support bracket to a second channel of the metal furring channels;

a right side mounting flange adjacent to the right side of the central web, the right side mounting flange abutting the lower reinforcing flange and projecting downwardly from the central web in the same downward direction as the lower reinforcing flange, the right side mounting flange extending longitudinally from adjacent the first end toward the second end, the right side mounting flange having a plurality of mounting holes therethrough arrayed longitudinally to align with at least one hole on a side of the electrical connection box;

a left side mounting flange adjacent to the left side of the central web, the left side mounting flange abutting the lower reinforcing flange and projecting downwardly from the central web in the same downward direction as the lower reinforcing flange, the left side mounting flange extending longitudinally from adjacent the first end toward the second end, the left side mounting flange having a plurality of mounting holes therethrough arrayed longitudinally to align with at least one hole on another side of the electrical connection box, the right and left side mounting flanges being spaced apart from one another on either side of the opening, the right and left side mounting flanges being adapted to receive the electrical connection box for mounting to the right and left side mounting flanges, the right and left side mounting flanges being biased inwardly toward one another for supporting the electrical connection box at least temporarily during installation prior to installation of fasteners through the plurality of mounting holes of the right and left side mounting flanges and into any hole in the electrical box, thereby allowing selective longitudinal and vertical placement of the electrical connection box;

a guide flange projecting downward from the central web at the first end, the guide flange having at least one guide hole therethrough for attachment to the first channel; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

10. A support bracket for an electrical connection box, for use with metal furring channels in a ceiling, the electrical connection box having a predetermined width and depth, the support bracket comprising:

a central web extending between opposite first and second ends and between opposite right and left sides, the central web having at least one first end hole therethrough adjacent the first end for selective receipt of a fastener for attachment to a first channel of the metal furring channels, the central web having a plurality of top holes therethrough arrayed longitudinally adjacent the second end for selective receipt of a fastener for attachment of the support bracket to a second channel of the metal furring channels, the central web further including a lower reinforcing flange that extends downwardly through the central web and around an opening in the central web;

a right side mounting flange adjacent to the right side of the central web, the right side mounting flange abutting the lower reinforcing flange and projecting downwardly from the central web in the same downward direction as the lower reinforcing flange, the right side mounting flange, the right side mounting flange having at least one mounting hole therethrough positioned to align with at least one hole on a side of the electrical connection box;

a left side mounting flange adjacent to the left side of the central web, the left side mounting flange abutting the lower reinforcing flange and projecting downwardly from the central web in the same downward direction as the lower reinforcing flange, the left side mounting flange having at least one mounting hole therethrough positioned to align with at least one hole on another side of the electrical connection box, the right and left side mounting flanges being spaced apart from one another and adapted to receive the electrical connection box for mounting to the right and left side mounting flanges, the right and left side mounting flanges being biased inwardly toward one another for at least temporarily supporting the electrical connection box during installation prior to installation of fasteners through the plurality of mounting holes of the right and left side mounting flanges and into any hole in the electrical box, thereby allowing selective longitudinal and vertical placement of the electrical connection box;

a guide flange projecting downward from the central web at the first end, the guide flange having at least one guide hole therethrough positioned to selectively receive a fastener for attachment to the first channel;

the support bracket being unitary adapted for installation on top of the metal furring channels so as to allow temporary support for the support bracket during installation, and to allow the support bracket to slide along the metal furring channels thereby allowing selective positioning; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

11. A support bracket for an electrical connection box, for use with metal furring channels in a ceiling, the electrical connection box having a predetermined width and depth, the support bracket comprising:

a central web extending between opposite first and second ends and between opposite right and left sides, the central web having an opening therethrough and a lower reinforcing flange that extends both about the opening and downwardly through the central web, the central web having at least one first end hole therethrough adjacent the first end for selective receipt of a fastener for attachment to a first channel of the metal furring channels, the central web having a plurality of top holes therethrough arrayed longitudinally for selective receipt of a fastener for attachment of the support bracket to a second channel of the metal furring channels;

a right side mounting flange adjacent to the right side of the central web, the right side mounting flange abutting the lower reinforcing flange and projecting downwardly from the central web in the same downward direction as the lower reinforcing flange, the right side mounting flange extending longitudinally from adjacent the first end toward the second end, the right side mounting flange having a plurality of mounting holes therethrough arrayed longitudinally to align with at least one hole on a side of the electrical connection box;

a left side mounting flange adjacent to the left side of the central web, the left side mounting flange abutting the lower reinforcing flange and projecting downwardly from the central web left side, in the same downward direction as the lower reinforcing flange, the left side mounting flange extending longitudinally from adjacent the first end toward the second end, the left side mounting flange having a plurality of mounting holes therethrough arrayed longitudinally to align with at least one hole on another side of the electrical connection box, the right and left side mounting flanges being spaced apart from one another on either side of the opening, the right and left side mounting flanges being adapted to receive the electrical connection box for mounting to the right and left side mounting flanges, the right and left side mounting flanges being biased inwardly toward one another for supporting the electrical connection box temporarily during installation prior to installation of fasteners through the plurality of mounting holes of the right and left side mounting flanges and into any hole in the electrical box, thereby allowing selective longitudinal and vertical placement of the electrical connection box;

a guide flange attached to the central web at the first end and disposed below the central web, the guide flange extending transversely between the right side and the left side of the central web, the guide flange having at least one guide hole therethrough adjacent the at least one first end hole, the guide flange being adapted for placement directly against the first channel so as to align the first end with the first channel, and to align the support bracket generally perpendicular to the first channel, the guide flange being adapted for bending around the first channel so as to sandwich the first channel between the guide flange and the central web with the at least one guide hole generally aligned with the at least one first end hole, the guide flange being adapted to receive a fastener that extends through the at least one guide hole, and guide the fastener through the first channel and through the at least one first end hole so as to clamp the first channel between the guide flange and the central web;

the support bracket being unitary and adapted for installation on top of the metal furring channels so as to allow at least temporary support for the support bracket during installation, and to allow the support bracket to slide along the furring channels thereby allowing selective positioning; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

12. The support bracket of claim 11, wherein the guide flange includes a region of weakness where the guide flange is attached to the central web, the region of weakness extending transversely between the right and left sides of the central web so as to facilitate the bending of the guide flange around the first channel.

13. The support bracket of claim 12, wherein the plurality of top holes, the plurality of mounting holes of the right side and left side mounting flanges, the at least one first end hole, and the at least one guide hole each further comprises an annular recess around the hole adapted for guiding the threaded fastener into the hole.

14. A method for supporting an electrical connection box with metal furring channels in a ceiling, the method comprising:

providing a support bracket having a unitary construction and a central web, the central web further including a lower reinforcing flange that extends downwardly through the central web and around an opening in the central web, the support bracket including a right side mounting flange and a left side mounting flange, the right side mounting flange being adjacent to a right side of the central web, the left side mounting flange being adjacent to a left side of the central web, the right and left side mounting flanges being biased inwardly toward one another for supporting the electrical connection box temporarily during installation and extending downwardly from the central web in the same downward direction as the lower reinforcing flange;

juxtaposing the support bracket between the metal furring channels;

attaching a first end of the support bracket to a first channel of the metal furring channels;

attaching a second end of the support bracket to a second channel of the metal furring channels; and supporting, by an inwardly biasing force of the right and left side mounting flanges and prior to inserting a fastener through either of the right and left side mounting flanges and into a hole of the electrical connection box, the electrical connection box between the right and left side mounting flanges;

attaching the supported electrical connection box to the right and left side mounting flanges; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

15. The method of claim 14, further comprising:
inserting the electrical connection box into an opening through the central web, wherein the opening extends transversely from adjacent the right side to adjacent the left side of the central web, and wherein the opening extends longitudinally from adjacent the first end toward the second end, the right side and left side mounting flanges being position on opposing sides of the opening, wherein the step of attaching the second end of the support bracket to the second channel comprises selectively inserting a fastener through one of a plurality of top holes in the second end of the support bracket;

wherein the step of attaching the first end to the first channel comprises inserting another fastener through a first end hole adjacent to the first end of the first channel;

wherein the step of supporting the electrical connection box between the right and left side mounting flanges includes selectively placing the electrical connection box longitudinally and vertically inbetween the right and left side mounting flanges; and wherein the step of attaching the electrical connection box to the right and left side mounting flanges comprises inserting a threaded fastener through at least one of a plurality of longitudinally arranged mounting holes in the right side and left side mounting flanges.

16. The method of claim 15, further comprising:
placing a guide flange directly against the first channel, thereby aligning the first end with the first channel, the guide flange being coupled to the first end of the central web, and wherein the guide flange extends transversely between the right side and the left side of the central web;

aligning the support bracket generally perpendicular to the first channel;

disposing the guide flange below the central web;

inserting a threaded fastener through at least one guide hole in the guide flange, the first channel, and the at least one first end hole.

17. The method of claim 16, wherein disposing the guide flange below the central web comprises:
bending the guide flange around the first channel, the guide flange being oriented in a generally downward direction relative to central web prior to bending;

sandwiching the first channel between the bent guide flange and the central web with the at least one guide hole being generally aligned with the at least one first end hole; and clamping the first channel between the guide flange and the central web with the threaded fastener.

18. The method of claim 17, wherein bending the guide flange comprises:
bending the guide flange around the first channel along a region of weakness, the region of weakness being at a region where the guide flange is coupled to the central web and extends between the right side and the left side of the central web.

19. The method of claim 18, wherein an annular recess is positioned around each of the plurality of top holes, the plurality of longitudinally arranged mounting holes in the right and left side mounting holes, the at least one first end hole, and the at least one guide hole.

20. A support bracket for an electrical connection box, for use with metal furring channels in a ceiling, the electrical connection box having a predetermined width and depth, the support bracket comprising:
a central web having opposite right and left sides, and extending longitudinally between opposite first and second ends, the first end having a first end hole therethrough for selective receipt of a fastener for attachment to a first channel of the metal furring channels, the end being adapted for attachment to a second channel of the metal furring channels, the central web having at least one mounting hole therethrough adapted for mounting the electrical connection box with a threaded fastener, the central web further including a lower reinforcing flange that extends downwardly through the central web and around an opening in the central web;

a right side mounting flange projecting from the central web right side in the same downward direction as the lower reinforcing flange away from a top side of the support bracket;

a left side mounting flange projecting from the central web left side in the same downward direction as the lower reinforcing flange away from the top side of the support bracket;

a first guide flange projecting downward from the central web at the first end and disposed below the central web, the first guide flange being adapted for placement against a first channel of the metal furring channels so as to align the first end of the central web with the first channel and to align the support bracket generally perpendicular to the first channel, the first guide flange having at least one first guide hole therethrough for attachment to the first channel, the first guide flange being adapted for bending around the first channel, so as to sandwich the first channel between the first guide flange and the central web, wherein the at least one first guide hole is positioned along the first guide flange such that the at least one first guide hole is aligned with the first end hole of the central web when the first guide flange is bent around the first channel, and wherein the support bracket is configured to clamp onto the first channel when the first channel is positioned between the first guide flange and the central web and a fastener extends through the at least one first guide hole, the first channel, and the first end hole; and a left side reinforcing flange and a right side reinforcing flange, the left side reinforcing flange being adjacent to the left side of the central web, the right side reinforcing flange being adjacent to the right side of the central web, the left side reinforcing flange and the right side reinforcing flange extending upwardly away from the central web in a direction that is opposite to the downwardly extending direction that the lower reinforcement flange extends through the central web.

21. The support bracket of claim 20, further comprising:
a region of weakness where the first guide flange is attached to the central web, the region of weakness extending transversely between the right and left sides of the central web so as to facilitate the bending of the first guide flange around the first channel; and
a plurality of top holes arrayed longitudinally through the central web for selective attachment of the support bracket to the second channel with a threaded fastener.

22. The support bracket of claim 20, further comprising:
a second guide flange attached to the second end, the second guide flange extending transversely between the right and left sides of the central web, the second guide flange having at least one second guide hole therethrough for attachment to the second channel, the second guide flange projecting downward from the central web, the second guide flange being adapted for bending around the second channel;
at least one second end hole adjacent to, and extending through, the second end, the at least one second end hole being adjacent to the second guide hole and sized and positioned to selectively receive a threaded fastener for attaching the second end to the second channel,
wherein the first and second guide flanges each have a region of weakness where each guide flange is attached to the central web, the region of weakness for each of the first and second guide flanges extending transversely between the right and left sides of the central web to facilitate the bending of each guide flange around the respective channel.

\* \* \* \* \*